United States Patent [19]

Rich et al.

[11] Patent Number: 4,700,205
[45] Date of Patent: Oct. 13, 1987

[54] HYDRAULIC SERVOMECHANISM FOR CONTROLLING THE PRESSURE OF WRITING FLUID IN AN INK JET PRINTING SYSTEM

[75] Inventors: Leonard G. Rich, West Hartford; Dale G. Blake, Tolland, both of Conn.

[73] Assignee: Metromedia Company, Secaucus, N.J.

[21] Appl. No.: 820,241

[22] Filed: Jan. 17, 1986

[51] Int. Cl.⁴ ............................................. G01D 15/16
[52] U.S. Cl. .................................. 346/140 R; 222/55; 417/45; 417/472
[58] Field of Search .................. 346/140; 417/472, 18, 417/19, 44, 45; 222/55, 56

[56] References Cited

U.S. PATENT DOCUMENTS

| | | | |
|---|---|---|---|
| 3,787,882 | 1/1974 | Fillmore | 346/140 X |
| 3,950,762 | 4/1976 | Anderka | 346/140 |
| 4,084,165 | 4/1978 | Skafvenstedt | 346/140 |
| 4,314,263 | 2/1982 | Carley | 346/140 |
| 4,475,116 | 10/1984 | Sicking | 346/140 |
| 4,562,445 | 12/1985 | Rich | 346/140 |
| 4,599,626 | 7/1986 | Rich | 346/140 |
| 4,651,161 | 3/1987 | Rich | 346/140 X |

Primary Examiner—Joseph W. Hartary
Attorney, Agent, or Firm—McCormick, Paulding & Huber

[57] ABSTRACT

A hydraulic servomechanism for controlling the pressure of ink supplied to an ink jet printer head includes a bellows located between an ink source and the head and arranged for expansion and contraction to decrease and increase the pressure of ink in the bellows.

Pressure is sensed at the bellows output connected to the ink head and the sensed pressure is compared to a desired ink pressure to produce a driving signal which excites an electromagnetic driver coupled to the bellows. The driver applies a force to the bellows to adjust the pressure to the desired pressure. A position sensing switch is responsive to the volume of the bellows and controls a valve located between an ink source and the bellows input to maintain the volume of ink in the bellows within a predetermined volumetric range.

5 Claims, 2 Drawing Figures

HYDRAULIC SERVOMECHANISM FOR CONTROLLING THE PRESSURE OF WRITING FLUID IN AN INK JET PRINTING SYSTEM

BACKGROUND OF THE INVENTION

The present invention relates generally to ink jet printing systems and deals more particularly with a hydraulic servomechanism for controlling the pressure of writing fluid supplied to an ink jet printer heat.

In an ink jet printer a receiving surface on which a graphic is to be created is moved relative to one or more ink jet printer heads in a line scanning fashion. As each printer head moves along a scan line, it moves past a succession of points on the line in relation to each of which the printer head may eject a drop of writing fluid such as ink, paint, pigmented ink, etc., which lands on and prints a dot at the position. In one type of printer head the head is actuated for each potential print point on the scan line, to eject a drop of ink for each such position, and then the drop is electrostatically controlled during its flight from the printer head to the receiving surface to either direct it onto the receiving surface or away from the receiving surface depending on whether the scan line point in question is to be printed or not. In such a printer head the actuation frequency, or the time between successive actuations is dependent on the speed of the printer head along the scan line.

In another type of printer head, referred to as a "drop-on-demand" printer head, as the printer head is moved along a scan line it is actuated to produce a drop of ink only for those potentional print positions along the scan line onto which the printing of dots is wanted. Therefore, the amount of time elapsing between successive actuations is dependent not only on the speed of the printer head relative to a receiving surface, but also on the pattern in accordance to which dots are to be printed along the scan line.

In either type of printer head described above, after a drop is ejected from the head, it travels for some distance in free flight from the printer head to the receiving surface along a trajectory path dependent on the velocity at which the drop is ejected. Changes in the ejected velocity therefore change the location at which a drop strikes the receiving surface and are quite undesireable. Also, for good printing all ejected drops should be of substantially the same volume so that all dots printed on the receiving surface by the separate drops are of substantially consistent size.

Because of fluid and mechanical dynamics involved in the actuation of a printer head, including resonances and other phenomena the ejected drop velocity and volume varies widely in many printer heads with the changes in the actuation frequency or the time elapsing between successive actuations. This may be somewhat troublesome in the use of electrostatically deflected printer heads in the cases where the printer head is moved at different speeds relative to the receiving surface. It is, however, particularly troublesome in the case of "drop-on-demand" printer heads in which the inherent operation of the printer involves a wide range in the elapsed time occuring between successive pulses. That is, while scanning a line during one portion of the line, the printer head may be actuated to print the dot at every potential print point, in which case a very short elapsed time occurs between successive actuations, and along other portions of the line, the printer head may be acutated to print the dot only at some ocassional potential print points in which case the time elapsing between successive actuations is considerably lengthened. In the case of large volume "drop-on-demand" ink jet printer heads which produce dots having a printed size ranging from 0.02 to 0.05 inches or larger, the fluid and mechanical dynamics of the printer head tend to limit the rate at which the dots may be ejected with a constant velocity and consistent volume. In U.S. Pat. No. 4,562,445, issued Dec. 31, 1985 to Rich and entitled METHOD AND APPARATUS FOR DRIVING AN INK JET PRINTER, and assigned to the same assignee as the present invention, a driving circuit for an ink jet printer head is disclosed for causing the printer head to eject the drops at a constant velocity despite changes in the time elapsing between successive actuations.

In another co-pending patent application entitled "Apparatus and Method for Dynamically Varying the Pressure of Writing Fluid Supplied to an Ink Jet Printer Head" Ser. No. 820,520 filed concurrently herewith and assigned to the same assignee as the present invention, now U.S. Pat. No. 4,651,161 a system for controlling the pressure of writing fluid supplied to an ink head is disclosed wherein the pressure of the ink supplied to the head is adjusted to compensate for pressure drops within the piezo cavity of the ink jet head associated with the higher actuation rates to cause the head to eject drops of consistent volume at the higher actuation rates. The writing fluid pressure control system disclosed in the above-identified patent application utilizes a pressure control mechanism to adjust the pressure and includes a variable volume fluid chamber. The chamber volume is increased or decreased in accordance with a dot rate command signal generated from a controller to adjust the pressure of the ink contained in the chamber. The ink in turn is supplied to the ink jet head at a desired pressure to insure that the pressure of the ink in the piezo cavity is at the desired pressure during actuation so that ejected drops are of a consistent volume over a large range of actuation frequencies.

An object of the present invention is, therefore, to provide a hydraulic servomechanism for controlling the pressure of writing fluid supplied to an ink jet printer head to insure that the printer head ejects drops of a substantially consistent volume over a wide range of actuation frequencies.

Another object of the present invention is to provide a hydraulic servomechanism that is responsive to a wide dynamic range of changes in ink jet printer head actuation frequencies.

A further object of the present invention is to provide a hydraulic servomechanism for use with a large scale ink jet printing system that is reliable, less costly and less complex than previously used pressure control mechanisms for controlling the pressure of writing fluid supplied to an ink jet printer head.

SUMMARY OF THE INVENTION

In accordance with the present invention, a hydraulic servomechanism for controlling the pressure of ink supplied to an ink jet printer head from an ink source is presented. The invention resides specifically in a bellows coupled between the ink source and the ink jet printer head and includes an inlet for receiving the ink and an outlet for discharging the ink. The bellows is arranged for expansion and contraction for increasing and decreasing its volume to decrease and increase respectively the pressure of the ink contained within the bellows. The inlet includes a valve for permitting ink to flow into the bellows when the valve is operated to its open condition and for preventing ink from entering the bellows when it is operated to its closed condition. The outlet includes a pressure sensor for sensing the pressure of the ink supplied to the ink jet printer head and produces a signal having a magnitude proportional to the sensed pressure.

The invention further resides in comparator means for comparing the sensed ink pressure to a desired ink pressure and the difference between the two pressures produces a driving signal. Excitation means coupled to the bellows is responsive to the driving signal and exerts a force on the bellows to expand or contract the bellows to decrease or increase the pressure of the ink in the bellows whereby the ink is supplied to the ink jet head at the desired pressure.

The invention further includes means for maintaining the volume of ink in the bellows within a predetermined volumetric range and includes means for operating the valve to its open condition when the ink volume is at a minimum desired volume and to its closed condition when the ink volume is at its maximum desired volume.

BRIEF DESCRIPTION OF THE DRAWINGS

Other features and advantages of the invention will be apparent from the following description and claims taken in conjunction with the accompanying drawings wherein:

DETAILED DESCRIPTION OF A PREFERRED EMBODIMENT

Figure 1:
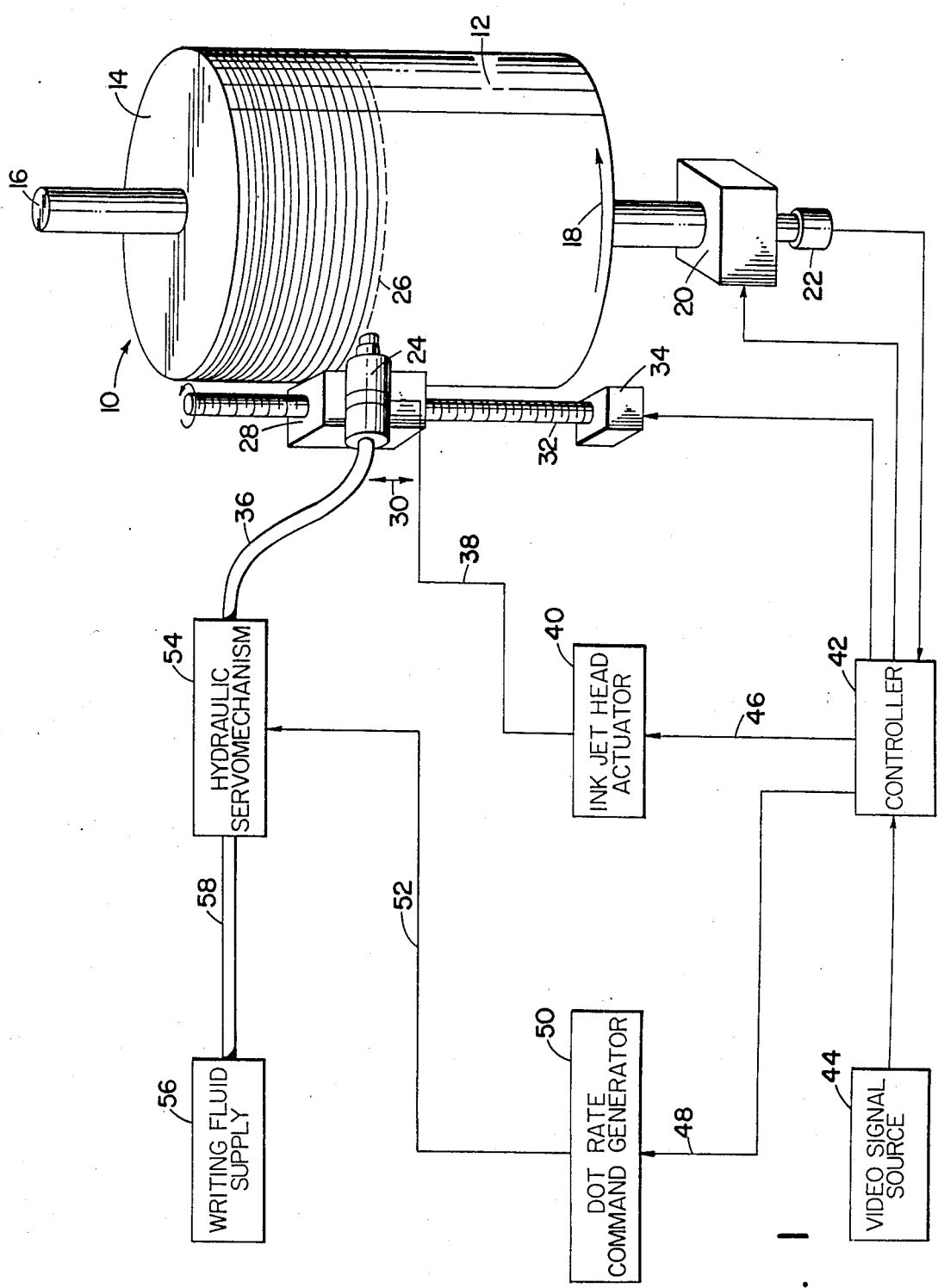
FIG. 1 is a schematic diagram, partly in block diagram form of a large-scale ink jet printing system of the general type using a pressure control mechanism for delivering writing fluid at a desired pressure to an ink jet head.

Turning now to the drawings and considering FIG. 1 in particular, an ink jet printer, indicated 10 is illustrated wherein a receiving surface 12 is located on the outside of a cylindrical drum 14 supported for rotation about a vertical axis 16. The drum 14 is driven in rotation, in the direction indicated by the arrow 18 about the vertical axis 16 by a drive motor 20 and the angular position of the drum with respect to the axis 16 is detected by an encoder 22. An ink jet printer head 24 is positioned to eject ink drops onto the receiving surface 12. As the drum 14 is rotated, the printer head 24 is moved slowly, downwardly so that at each revolution of the drum, the printer head scans a new line 26 on the receiving surface 12, each scan line actually being one convolution of a continuous helical line. To achieve this downward motion, the printer head 24 is mounted on a carriage 28 driven in the vertical direction, indicated by the arrow 30, by a lead screw 32 rotated by a drive motor 34. Writing fluid or ink is supplied to the printer head 24 through a tube 36 connected to the hydraulic servomechanism embodying the present invention illustrated generally by the function block 54 and described in detail hereinbelow. Electrical power for actuating the printer head 24 is supplied to it through a set of electrical conductors 38, the conductors more particularly being connected to a piezoelectrical activating element forming a part of the printer head. The source of drive signals for activating the printer head 24 is provided by an ink jet head actuating means 40.

In FIG. 1 the printer 10 is controlled by a control means 42 which receives signals from the encoder 22 and furnishes signals to the drive motors 20 and 34 creating and controlling the relative motion between the receiving surface 12 and the ink jet printer 24. The control means 42 is also responsive to input video signals produced by a video signal means 44 and in response to which timing signals are output on the line 46 each timing signal of which dictates one actuation of the ink jet printer head 24. The control means 42 generates the timing pulses in syncronism with the relative movement between the receiving surface 12 and the printer head 24 so that each time the printer head is moved to a new potential print position, a timing pulse is created or not depending whether or not an ink dot is to be printed at that position. The control means 42 also generates a set of timing pulses on the lead 48 which pulses are related to the desired ink pressure at the printer head 24. The pressure relates pulses are received by the dot rate command generating means 50 which generates a signal on the line 52 and the dot rate generator 50 is connected to the hydraulic servomechanism 54 embodying the present invention. the dot rate command signal is representative of a desired ink pressure at the ink jet head and this signal is compared to a signal representative of the ink pressure at the ink jet head. A signal represesative of the difference between the sensed and desired pressure signals is used to drive the hydraulic servomechanism to adjust the pressure of the writing fluid supplied to the ink jet head. A writing fluid supply 56 is connected to the hydraulic servomechanism 54 by a tube 58 and supplies ink to the servomechanism and the printer head. A circuit for varying the pressure of ink supplied to an ink jet head in accordance with the instantaneous dot generation rate is disclosed in the above-referenced patent application, Ser. No. 820,520 filed concurrently herewith in the name of Dale G. Blake and Leonard G. Rich, entitled, "Apparatus and Method for Dynamically Varying The Pressure of Writing Fluid Supplied to an Ink Jet Head", and assigned to the same assignee as the present invention, now U.S. Pat. No. 4,651,161 the disclosure of which application is incorporated herein by reference and to which application reference may be made for further details of the circuit.

Figure 2:
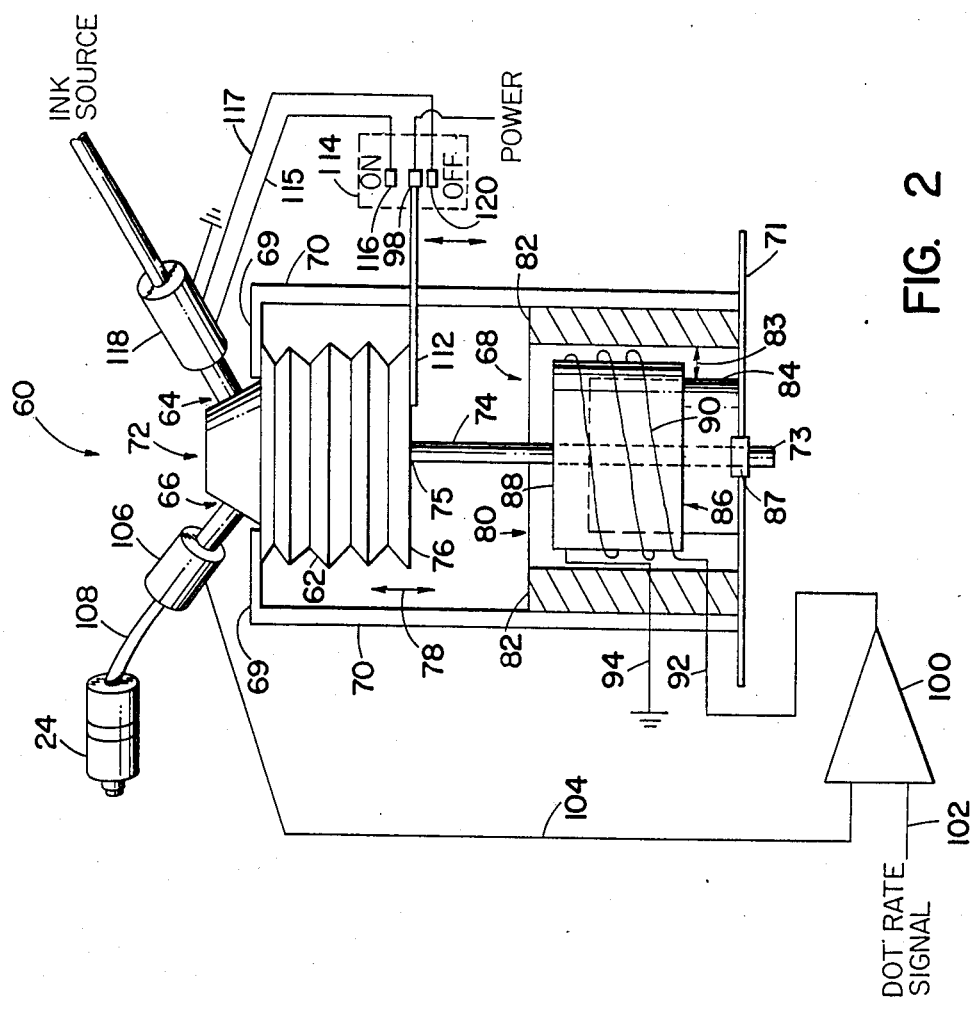
FIG. 2 is a diagram of a hydraulic servomechanism particularly adapted for use in the large scale ink jet printing system of FIG. 1 shown with a sectioned view of the outer wall of the electromagnetic driver.

Turning now to FIG. 2, a hydraulic servomechanism embodying the present invention is presented by way of example in a preferred embodiment and is indicated at 60. The hydraulic servomechanism 60 comprises a bellows 62 including an inlet 64 and outlet 66 located at one end 72 of the bellows. The bellows 62 is preferably made of a flexible, relatively non-elastic and non-porous material such as very thin stainless steel to permit contraction and expansion of the bellows without bulging or deforming the sides. Bellows of the type used with the present invention are commercially available and well known to those skilled in the art. One such bellows, for example, is available as part number 84-52-1-EE from the Standard Welded Bellows Company.

Still referring to FIG. 2, one end of a supporting member 70 is connected to a base plate 71 and is arranged at its other end 69 to be fixedly attached to the end 72 of the bellows 62 to hold the end 72 in a fixed spacial relationship with the base plate 71.

An electromagnetic driver assembly 68 is also mounted on the base plate 71 and operates similarly to that of a voice coil of the type generally used to displace the cone of a loud speaker. In the illustrated example, the assembly 68 includes a permanent magnet 80 comprising a circular outer wall 82 and a center pole piece 84. The pole piece 84 is concentric with the wall 82 and an annular air gap 83 is formed between the wall and the pole piece and a magnetic field is supported across the air gap. A coil assembly or armature 86 comprises a bobbin 88 arranged for axial movement over the center pole piece 84 and within the air gap 83. A conductor 90 is wound around the bobbin to form the coil. The coil assembly 96 moves axially when the coil is excited by an electrical signal applied across the ends 92, 94 of the conductor 90. The excitation of the coil assembly 86 produces an electromagnetic field which reacts with the magnetic field across the air gap 83 to move the armature in a direction toward and away from the base plate 71 in the direction of arrow 78.

The coil assembly 86 includes a connecting rod 74 which is fixedly attached to the bobbin 88 and extends axially through the center of the bobbin and through the center of the pole piece 84. One end 75 of the connecting rod 74 is attached to the end 76 of the bellows 62. The other end 73 of the rod 74 extends through a bearing 87 in the base of the driver assembly 68 to prevent lateral movement of the coil assembly 86 as it moves axially in the direction of arrow 78.

The excitation signal used to excite the coil assembly 86 is generated by a comparator 100 and the output of the comparator is connected to one end 92 of the conductor 90. The comparator 100 has an input 102 electrically coupled to a dot rate command generating source which source produces an electrical signal representative of a desired ink pressure at the ink jet head and is related to the instantaneous rate at which drops are ejected from the printer head 24. Another input 104 of the comparator 100 is connected to a pressure sensor 106 which sensor is located between the outlet 66 of the bellows 62 and the ink jet printer head 24. The sensor 106 senses the pressure of the ink in a conduit 108 connecting the bellows outlet 66 and the ink jet head 24 and in response to sensing the pressure generates a signal which is proportional to the pressure of the ink supplied to the ink jet head 24. The comparator 100 compares the signals appearing on its input leads 102 and 104 respectively and generates an excitation signal at its output 92 to excite the coil assembly 86 causing the assembly to exert a force on the end 76 of the bellows 62 proportional to the difference in the two pressure signals. The magnitude of the excitation signal is dependent on many factors including fluid dynamics, the particular ink jet head used, the actuation frequency of the ink jet head and the hydraulic characteristics of the ink supply and is generally determined experimentally.

Ink is supplied to the bellows 62 from a pressurized source (not shown, but typically the pressure is 10-15 psi) through for example, an electrically operated valve 118 connected between the source and the inlet 64 of the bellows. THE ELECTROMAGNETIC DRIVER assembly 68 maintains a force on the end 76 of the bellows as ink is discharged from the bellows outlet 66 to produce the desired ink pressure and the volume of ink within the bellows decreases as ink drops are ejected from the ink jet printer head 24. The bellows 62 contracts, that is, its volume is reduced until such time as a position actuating rod 112 coupled to one end 76 of the bellows 62 causes a switch 114 coupled to the valve 118 to operate to its ON position.

The switch 114 has an ON and OFF position and when operated to the ON position, a contact 98 at the end of the rod 112 is moved into electrical and physical contact with a contact 116 of the switch 114. The switch 114 is electrically connected to the valve 118 by electrical conductors 115,117 and in its ON 6 of the switch 114. The switch 114 is electrically connected to the valve 118 by electrical conductors 115,117 and in its ON position completes an electrical circuit to the valve 118 via conductor 115 which supplies power to the valve to operate the valve to its open condition. The operation of the valve 118 permits ink to flow from the ink source into the bellows 62 to replenish the ink in the bellows. As ink fills the bellows 62, the bellows expands until such time that the position rod 112 and its associated contact 98 moves into electrical and physical contact with the OFF contact 120 of the switch 114. The electrical circuit is now completed via conductor 117 and power is supplied to the valve 118 to operate it to its OFF condition to stop the flow of ink into the bellows 62. Consequently, as a result of this toggling action, the volume within the bellows 62 is maintained within a desired minimum and maximum volume to insure that an adequate supply of ink is available for delivery at the desired pressure to the ink jet printer head. It is important to note that the electromagnetic driver assembly 68 supplies the required force on the bellows and to produce the desired ink pressure at all ink volumes within the desired volumetric range.

In one actual embodiment of the hydraulic servomechanism the ink pressure was controlled and varied over a frequency actuation range to permit a "drop on demand" large volume ink jet printer head to eject drops having a consistent volume over a dot generation range covering low actuation frequencies to actuation frequencies corresponding to a dot generation rate of approximately 4,000 or more dots per second.

A hydraulic servomechanism has been described in a preferred embodiment; however, numerous changes and modifications may be made by those skilled in the art without departing from the spirit and scope of the invention. Therefore, the invention has been described by way of example rather than limitation.

We claim:

1. A hydraulic servomechanism for controlling the pressure of ink supplied to an ink jet printer head from an ink source, said servomechanism comprising:
   a bellows coupled between the ink source and the printer head and arranged for expansion and contraction to increase and decrease the volume of the bellows, said bellows including:
   (a) two ends and fan folding sides, one of said ends being arranged for relative movement toward and away from the other of said ends for contracting and expanding the bellows;
   (b) means including a valve forming an inlet for receiving the ink from the ink source;
   (c) means including a pressure sensor forming an outlet for discharging the ink to the ink jet head, said sensor producing a sensed pressure signal having a magnitude proportional to the sensed pressure;
   (d) means for maintaining the ink contained in the bellows within a predetermined volumetric range and including actuating means for operating the valve to permit ink to flow into said bellows when said ink volume is at a minimum desired volume and to prevent ink from flowing into said bellows when said ink volume is at a maximum desired volume and to keep ink from flowing into said bellows during the time interval until said minimum volume is sensed;

a comparator for comparing the sensed pressure signal to a pressure signal representative of a desired pressure at the ink jet printer head and for producing a driving signal representative of the difference between the sensed and desired pressure at the ink jet head;

an electromagnetic driver having its armature connected to the moveable end of said bellows and being responsive to said comparator for moving said one end of said bellows to expand and contract the bellows in accordance with the driving signal whereby the pressure of the ink in the bellows is decreased and increased to discharge ink at the desired pressure.

2. A hydraulic servomechanism as defined in claim 1 further characterized by said valve being electrically operable between an open condition and a closed condition.

3. A hydraulic servomechanism as defined in claim 2 further characterized by said actuating means including a position sensitive transfer switch coupled to the moveable end of said bellows and electrically coupled to said valve, said switch having an ON and OFF position corresponding to said valve open and closed positions, said switch including a position rod connected to said bellows moveable end and arranged to move with the end, said rod having an electrical transfer contact remote from its bellows end and within the switch for making electrical contact with an electrical contact in the switch corresponding to the ON position when said rod moves in a one direction associated with the bellows contracting and with an electrical contact in the switch corresponding to the OFF position when said rod moves in a direction associated with the bellows expanding, said transfer contact being connected to a source of electrical power for transferring power to the electrical contacts associated with the ON and OFF positions respectively to operate the valve between its open and closed positions.

4. A hydraulic servomechanism for controlling the pressure of a fluid in a hydraulic circuit including a pressurized fluid source and a fluid ejector in series with the source, said servomechanism comprising:

means forming a variable volume chamber for containing the fluid and arranged for increasing and decreasing the volume of the chamber, said chamber having means forming an inlet for receiving the fluid and means forming an outlet for discharging the fluid, said inlet being connected to the fluid source and said outlet being connected to the fluid ejector;

means coupled between said outlet and the fluid ejector for sensing the pressure of the fluid at the fluid ejector and for producing a sensed pressure signal, said sensed signal having a magnitude and being representative of said sensed pressure;

means for comparing said sensed pressure signal to a pressure signal representative of a desired pressure at the fluid ejector to produce a driving signal;

excitation means coupled to said chamber and responsive to said comparing means for varying the volume of the chamber to increase and decrease the pressure of the fluid in the chamber in accordance with said driving signal information whereby the pressure of the fluid in the chamber is adjusted to discharge fluid to the fluid ejector at the desired pressure, and means for maintaining the amount of fluid in said chamber within a predetermined volumetric range, said maintaining means, including:

a. means associated with said chamber for sensing the fluid volume at a point representative of a minimum desired volume and at a different point representative of a maximum desired volume, and b. means responsive to the sensing of said minimum and maximum desired volume for allowing fluid to enter said chamber when said minimum volume is sensed and for preventing fluid from entering when said maximum volume is sensed and during the time interval until said minimum volume is sensed.

5. A hydraulic servomechanism as defined in claim 4 further characterized by:

said volume sensing means comprising a position sensitive switch having a first and second operative position and actuating means for transferring said switch between said first and second positions, said actuating means being coupled to said chamber volume varying means for movement with the varying means, said switch being transferred to said first position when said chamber volume is at said point corresponding to minimum desired volume.

* * * * *